(12) United States Patent
Purdy

(10) Patent No.: US 6,364,055 B1
(45) Date of Patent: Apr. 2, 2002

(54) ACOUSTICALLY NON-RESONANT PIPE

(76) Inventor: Alan H. Purdy, 941 Cycad Dr., San Marcos, CA (US) 92078

( * ) Notice: Subject to any disclaimer, the term of this patent is extended or adjusted under 35 U.S.C. 154(b) by 0 days.

(21) Appl. No.: 09/669,748

(22) Filed: Sep. 26, 2000

(51) Int. Cl.$^7$ .................................................. F01N 1/12
(52) U.S. Cl. ........................................ 181/279; 181/268
(58) Field of Search .................................. 181/268, 279

(56) References Cited

U.S. PATENT DOCUMENTS

| | | | |
|---|---|---|---|
| 3,580,357 A | 5/1971 | Whitney | 181/44 |
| 3,700,069 A | 10/1972 | Raush | 181/36 B |
| 3,913,703 A | 10/1975 | Parker | 181/44 |
| 3,948,349 A * | 4/1976 | Bychinsky | 181/44 |
| 4,165,798 A | 8/1979 | Martinez | 181/268 |
| 5,327,957 A * | 7/1994 | Killebrew | 165/161 |

OTHER PUBLICATIONS

Herschel 1833 Phil. Mag. vol. 3 p. 111.
Quincke 1866 Ann. d. Physik. vol. 28 p. 177.
Stewart 1928 Pys. Rev., vol. 31, p. 696.

* cited by examiner

Primary Examiner—Robert E. Nappi
Assistant Examiner—Kim Lockett

(57) ABSTRACT

A non-resonant pipe assembly comprised of two acoustical pipe paths in phase opposition. One pipe path by its physical presence will act as a half wave. The other pipe path is longer than the first by an odd integer multiple of the first path.

1 Claim, 2 Drawing Sheets

ACOUSTICALLY NON-RESONANT PIPE

BACKGROUND

1. Field of Invention

This invention relates to methods of preventing acoustical resonance in pipes of any length and specifically those pipes that conduct sound waves between a noise source and another part of a closed system or into the atmosphere.

2. Discussion of Prior Art

The theoretical problem of sound wave suppression in pipes was partially solved by Herschel using the means of sound wave interference in 1833 (Phil. Mag. Vol. 3, page 111, 1833). This theoretical approach by Herschel was put into practical form by Quincke in 1866 (Ann. d. Physik. Vol. 28, p. 177, 1866). In 1928 Stewart showed that the simple Herschel explanation was incomplete and needed to take into account additional reflections (Pys. Rev., Vol. 31, page 696 1928). Stewart showed that sound wave interference pipes not only suppressed the fundamental and harmonics by the use of interfering pipes but many other frequencies as well.

Wave interference type mufflers are disclosed in U.S. Pat. No. 3,580,357 issued May 25, 1971 to Whitney, Pat. Nos. 3,700,069 issued Oct. 24, 1972 to Rausch et al. Pat. Nos. 3,948,348 and 3,948,349 issued Apr. 6, 1976 to Bychinsky, Pat. No. 3,913,703 issued Oct. 21, 1975 to Parker and Pat. No. 4,165,798 issued Aug. 28, 1979 to Martinez.

Such arrangements have two relatively open exhaust flow paths through which a total exhaust stream is divided. In these arrangements the acoustical lengths of the concentric or other pipes are selected to be 180 degrees out of phase at their termination, to cancel the unwanted frequency. In addition, the Rausch patent adds a leakage path to suppress high frequencies.

The problem with approach used in the above patents is that all of them fail to take into account the fact that mufflers in general are connected to exhaust and or tail pipes. These pipes resonate at some fundamental frequency as well as various harmonic frequencies associated with the length of the pipe. All internal combustion engines and most fans and pumps emit a broad band of sound frequencies. Thus they will acoustically excite the pipes attached to them. Suppression of one or a few frequencies will still allow other frequencies to pass through the pipes, leading to unwanted noise.

It is important to note that most practical mufflers are designed to suppress the fundamental frequencies of the pipes to which they are connected.

Two examples of noise from unsuppressed pipe resonance are race car exhausts and large leaf blowers.

With my intention the pipes will not resonate, and the need for the complex soundwave traps are proposed by the above patents are no longer needed. The above patents have failed to attack the basic problem. They have failed to see the forest for the trees.

In current automotive mufflers in practice, high frequencies are suppressed by "bean cans". These are discreet chambers concentric to the exhaust flow pipes. Louvers in the exhaust flow pipe connect acoustically with the chambers. To suppress the low frequencies associated with exhaust and tailpipe resonance, large tuned chambers are used (often with Helmholtz resonators).

Each of the above cited patents tend to attenuate a discrete frequency or frequencies by the principle of sound wave interference. The frequencies that these mufflers tend to attenuate are usually those multiple frequencies that are generated by the engine, rather than the most important cause of low frequency noise, that created by the resonant pipes by means of which these mufflers are connected into the system.

OBJECTS AND ADVANTAGES

Accordingly, the main object of my invention is to eliminate or greatly reduce acoustical resonance in pipes of any length by means of sound wave interference.

A further object of my invention is to greatly reduce the noise produced by non-muffled exhaust or intake pipes in fluid flow systems. This includes gas or liquid systems. Yet another object of my invention is to eliminate or greatly reduce the size of mufflers or intake silencers in fluid flow systems.

Yet another object of my invention is to eliminate destructive resonance in hydraulic system pipes.

yet another object of my invention is to produce an acoustically non-resonant pipe that is easy to manufacture.

Yet another object of my invention, in the case of leaf blowers and similar machines, is to impart a rotary motion to the gas flow to provide increased stability of the jet which is issued from the pipe.

Further objects and advantages of my invention will become apparent from a consideration of the drawings and ensuing description thereof.

DRAWING FIGURES

Figure 3:
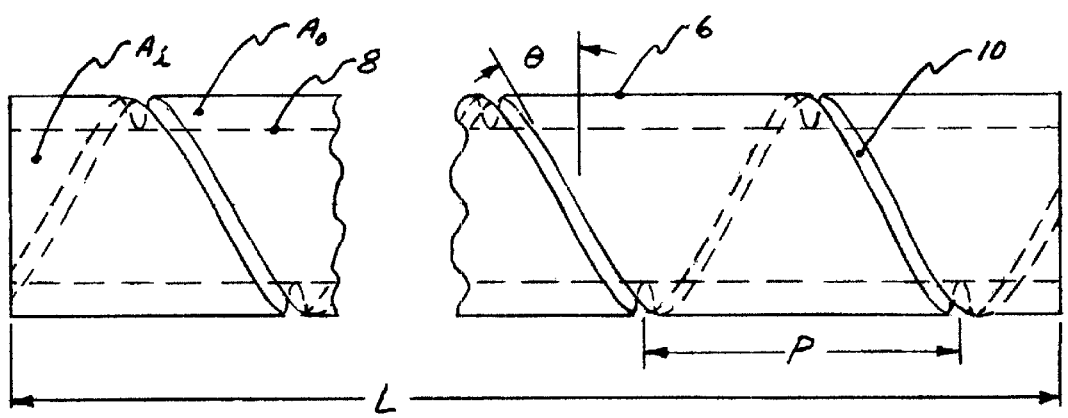

FIG. 3. is a longitudinal view of a non-resonant pipe produced by forming the baffle from the outside pipe.

Figure 4:
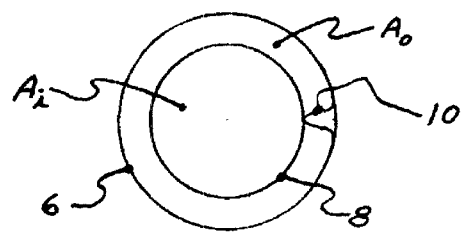

FIG. 4. is an end view of FIG. 3.

List of Reference Numerals or Symbols FIG. 1 through 4
6 . . . outside pipe
8 . . . inside pipe
10 . . . helical baffle
A . . . outside area
A . . . inside area
L . . . lenth of pipe assembly
P . . . lead or pitch of the helical baffle
θ . . . helix angle, theta

DESCRIPTION

Figure 1:
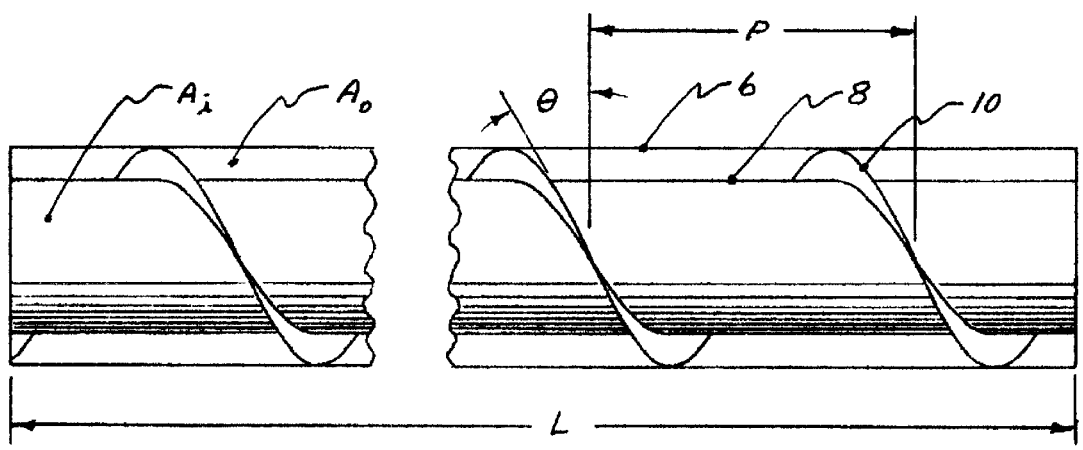
FIG. 1, is a view in longitudinal cross section of an acoustically non-resonant pipe constructed in accordance with my invention.
Figure 2:
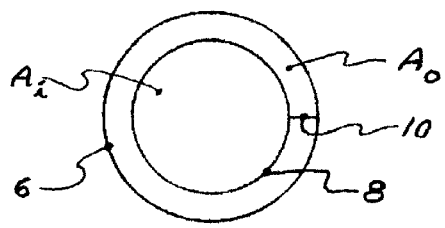
FIG. 2, is an end view of FIG. 1.

FIGS. 1 and 2

First Embodiment

Referring to FIG. 1 and FIG. 2, a cross sectional view and an end view of the first embodiment of a non-resonant pipe assembly is shown. An outside pipe is no.6. An inside pipe is no.8. A helical baffle is no.10. A helical baffle angle is θ, theta. An outside area is $A_o$. An inside area is $A_i$. Any length of the pipe assembly is L. A lead or pitch of the helical baffle is P.

FIGS. 3 and 4

Second Embodiment

Referring to FIG. 3 and FIG. 4, a longitudinal and end view show the second embodiment of my invention. An outside pipe is no.6. An inside pipe is no.8. A helical baffle, formed from the outside pipe no.6, is no.10. A baffle angle is θ, theta. Any length of the pipe assembly is L. A pitch of the baffle is P.

OPERATION AND THEORY

To function correctly, the non-resonant pipe should have $A_o$, the outside area, equal to $A_i$, the inside area. In the theoretical calculation of the equality of the areas, the following is true:

$$r_i = 0.7071\ r_o$$

Where $r_o$ is the radius of the outside pipe 1, and $r_i$ is the radius of the inside pipe 2.

In the practical calculation of the inside and outside areas of the non-resonant pipe, the thickness of the construction material as well as the tooling of the outer pipe bending or formation of the baffle, must be taken in account.

To manufacture a non-resonant pipe, where the acoustic waves arrive at the termination of the pipe in 180 degrees opposition, the baffle helix angle, theta θ must be calculated. Theta θ is the angle that the helical baffle makes with respect to the longitudinal axis of the pipe. Therefore it is necessary to select the ratio of the length of the inner pipe to the helical acoustic path located on the centroid of the outer area. $A_o$. This ratio may be found by the use of the Herschel expression:

$$(2K-1)L'/2$$

Where L' is the wave length and K is any integer.

In words, this expression says, that to be in phase opposition with two pipes, one must be longer than the other by a length that is an odd integer multiple of the half wave length of the sound wave.

The general wave equation is: $f = c/\lambda$. When applied to acoustics:
f=the frequency of the sound wave.
c=the speed of the sound wave.
λ=the length of the sound wave.

The simple equation for acoustic resonance in an open ended pipe is: $f = c/2L$.
where:
f=the frequency of sound wave resonance.
c=the speed of the sound wave.
2L=equals twice the length of pipe.

It is evident that an open-ended pipe, cut to any practical length, will select the Frequency at which it will resonate. Therefore, according to the general wave equation, it will also select its own wave length.

In my invention, the inner pipe, no. 8 would always tend to resonate as half wave pipe unless suppressed by the outer pipe no. 6 in half wave interference. Since the pipe assemblies, FIG. 1 and FIG. 3, in my invention can be of any length, then 1 can be substituted for L' in the above Herschel expression. Solving for K=1, 2, 3, 4, etc., the following ratios are of practical value: 1/2, 3/2, 5/2, 5/2.

Solving the above ratios for their helical baffle angle, theta θ, has the angles: 30 degrees, 41.81 degrees, 23.58 degrees and 16.59 degrees respectively. The inner pipe no. 8 may have an operating temperature different than outer pipe no. 6; this, in addition to end effects, my change these angles somewhat.

In fabricating these non-resonant pipes, the 30 degree baffle is the most economically efficient for straight pipes. However, in the case of pipes that must be bent, the smaller angles or multiple baffles of the same helical angle may be more desirable to support the outer pipe in the fabrication process.

Another useful property in the manufacture of the non-resonant pipe is the helix lead, also call the pitch. The lead or pitch can be found by the following equation:

$$\text{Tan } \theta (1.732 r_o) = P$$

Where the θ, is the angle that the helical baffle makes with respect to the longitudinal axis of the pipe, $(1.732 r_o)$ represents the radius of the centroid of the outer area $A_o$, and P is the lead or pitch.

The first embodiment of my invention is shown FIG. 1 and FIG. 2. For manufacturing this embodiment, for instance in a leaf blower pipe of plastic is the material of choice. The inner pipe 8, and helical baffle 10, could be injection molded in place with the outer pipe 6, solvent welded, heat welded or heat shrunk in place. It may also possible to extrude the complete pipe assembly. Another method of forming the helical baffle 10, in easily heat formed material such as plastics, is to use hot dies on the outer pipe 6.

The second embodiment of my invention is shown in FIG. 3 and FIG. 4. For manufacturing this embodiment, for instance in an exhaust or tail pipe of an automobile, metal is the material of choice. In this case, the outer pipe 6, is formed into the helical baffle 10. Spinning, progressive dies or hydraulic pressure can be used to form the helical baffle 10.

CONCLUSION, RAMIFICATIONS, AND SCOPE

Therefore, the reader will see that the invention of the non-resonant pipe assembly eliminates or greatly reduces acoustical resonance in pipes of any length, thus greatly reducing the noise produced by non-muffled exhaust or intake pipes. In the case where mufflers are needed, their size will be greatly reduced by use of the non-resonant pipe assembly. The reader will also see that his invention can eliminate destructive resonance in hydraulic system pipes. A valuable side benefit of this invention, due to the rotary motion of the exhaust induced by the helical baffles, will be increased stability of the jet. Because of this stability, the jet will project further from a vehicle or leaf blower. Further the reader will see that the invention is easy to manufacture.

While my above description contains may specifisities, these should not be construed as limitations on the scope of the invention, but rather as an exemplification of a preferred embodiment thereof. Many other variations are possible. For example, to archive non-resonant conditions, one pipe may be wrapped around the other. Another might be hydraulic formation of the helical baffles.

Accordingly the scope of the invention should be determined not by the embodiment illustrated, but by the appended claims and their legal equivalents.

What is claimed is:

1. A non-resonant, concentric pipe assembly of various lengths, comprised of two pipes of equal length, where one pipe, due to helical baffling configuration, has an acoustical length that is an odd integer multiple of the half wave length of the other.

\* \* \* \* \*

UNITED STATES PATENT AND TRADEMARK OFFICE
CERTIFICATE OF CORRECTION

PATENT NO.    : 6,364,055 B1
DATED         : April 2, 2002
INVENTOR(S)   : Alan H. Purdy It is certified that error appears in the above-identified patent and that said Letters Patent is hereby corrected as shown below:

Column 4,
Line 9, add the Greek letter -- Pi -- to the equation as shown:

$$Tan\theta(1.732r)\pi = P$$

Signed and Sealed this

Sixth Day of August, 2002

Attest:

Attesting Officer

JAMES E. ROGAN
*Director of the United States Patent and Trademark Office*